US007707603B2

(12) United States Patent
Abanami

(10) Patent No.: US 7,707,603 B2
(45) Date of Patent: Apr. 27, 2010

(54) DIGITAL MEDIA TRANSFER BASED ON USER BEHAVIOR

(75) Inventor: Thamer Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 11/045,848

(22) Filed: Jan. 28, 2005

(65) Prior Publication Data
US 2006/0174008 A1 Aug. 3, 2006

(51) Int. Cl.
  H04N 7/10 (2006.01)
  H04N 7/025 (2006.01)
  H04H 60/33 (2008.01)
  H04H 60/32 (2008.01)
  G06F 3/00 (2006.01)
  G06F 12/00 (2006.01)

(52) U.S. Cl. .............................. 725/34; 725/9; 725/10; 725/11; 725/12; 725/13; 725/14; 725/16; 725/35; 725/46; 707/204

(58) Field of Classification Search ............... 725/9–14, 725/16, 34–35, 46; 707/204
See application file for complete search history.

(56) References Cited

U.S. PATENT DOCUMENTS

| 5,798,785 A * | 8/1998 | Hendricks et al. ............. 725/46 |
| 5,920,700 A * | 7/1999 | Gordon et al. ............... 709/226 |
| 6,898,762 B2 * | 5/2005 | Ellis et al. ..................... 715/716 |
| 2002/0078075 A1 * | 6/2002 | Colson et al. ................ 707/204 |
| 2003/0079038 A1 * | 4/2003 | Robbin et al. ................ 709/232 |
| 2003/0217057 A1 * | 11/2003 | Kuroiwa et al. ................. 707/7 |
| 2003/0217121 A1 * | 11/2003 | Willis ......................... 709/219 |
| 2003/0225777 A1 * | 12/2003 | Marsh ......................... 707/101 |
| 2005/0147130 A1 * | 7/2005 | Hurwitz et al. .............. 370/503 |
| 2005/0235015 A1 * | 10/2005 | Abanami et al. ............ 707/204 |

FOREIGN PATENT DOCUMENTS

WO   WO02052540   7/2002

OTHER PUBLICATIONS

Abanami; "Crystal Media Profile Manager Scenarios Overview"; Mar. 18, 2003; http://team/sites/crystal; Microsoft Crystal Specification Oct. 5, 2004; pp. 1-8.
EP Search Report for Application No. 05112791.8 mailed on Mar. 6, 2007.

* cited by examiner

Primary Examiner—Dominic D Saltarelli
Assistant Examiner—Gigi L Dubasky
(74) Attorney, Agent, or Firm—Lee & Hayes, PLLC

(57) ABSTRACT

A collection of digital media is stored at a source device and transferred to a target device. A subset of the collection may be transferred based on a priority related to a points assigned by a user's rating of particular digital media and on rules based on particular user actions.

19 Claims, 6 Drawing Sheets

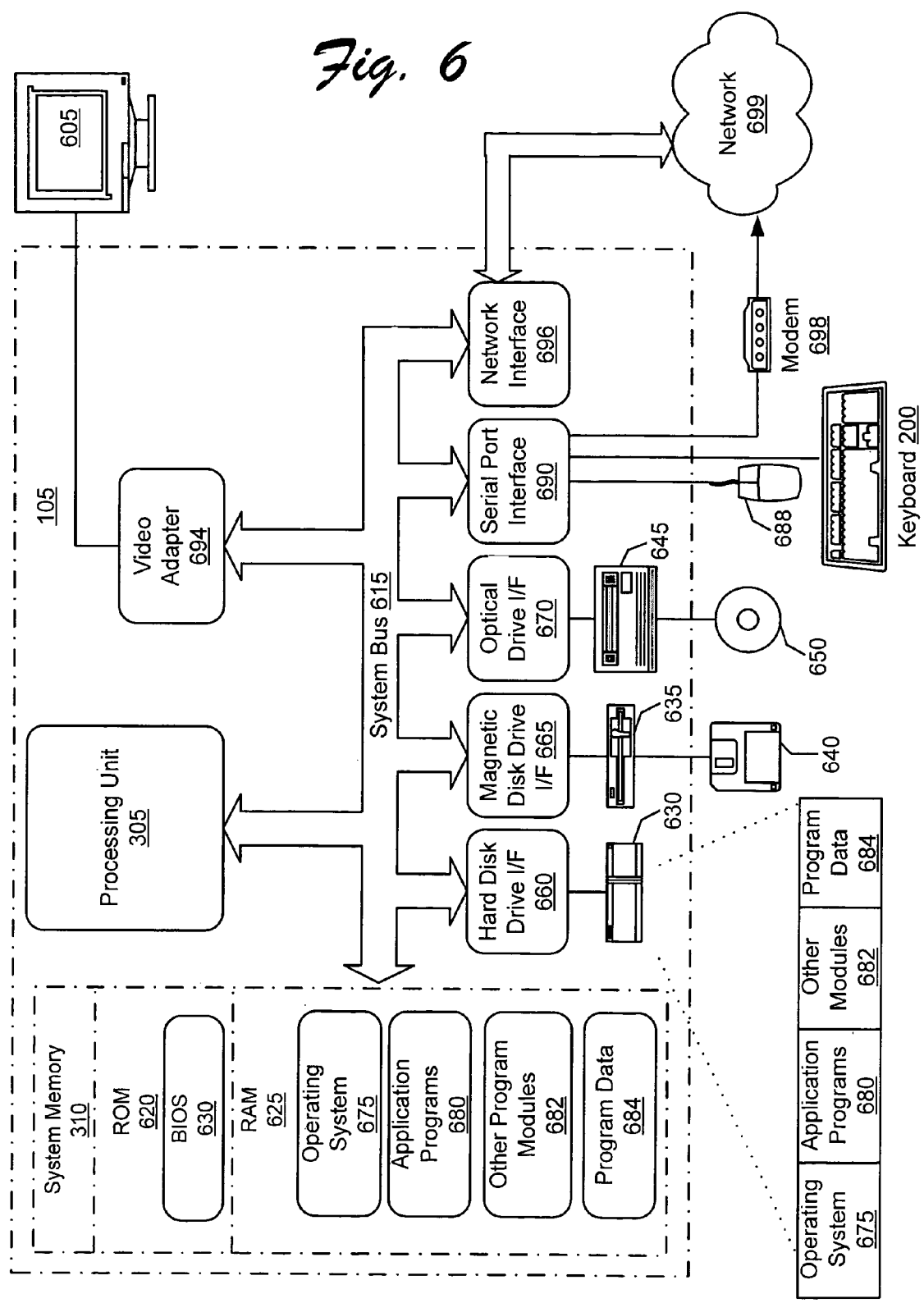

DIGITAL MEDIA TRANSFER BASED ON USER BEHAVIOR

TECHNICAL FIELD

This invention relates to transferring data such as digital media from one computing device to another computing device.

BACKGROUND

Due to the advance of digital media technology and decreasing price of computer storage, users increasingly store digital media collections on their main personal computers (PC). Digital media includes music, pictures, videos and the like. However, not all consumption or use of digital media occurs on a user's main PC. Increasingly users are transferring all or some of their collection to portable computing devices such as personal media players (e.g. portable music players), personal digital assistants (PDA), and laptop computers. Transferring allows the user to enjoy the media without being tied to the user's main PC.

With larger collections of digital media and the advent of high capacity storage on portable computing devices, filling portable computing devices with a meaningful subset of a user's digital media collection can be a laborious task. This is especially the case when the user's digital media collection on the main PC is larger than the storage available on the portable computing device.

Conventionally, the user is left to manually manage this problem. If the collection of digital media on a source device (e.g., main personal computer) exceeds the storage capacity of a target device (e.g., a portable computing device), the user manually selects which items to include (and/or exclude) in a transfer to the target device.

Furthermore, in conventional approaches, the user may have to remove digital media from an otherwise full memory of the target device when the user wishes to replace such digital media with new digital media from the collection resident at the source device.

SUMMARY

A source computing device connects with a target computing device and determines the storage capacity of the target device to receive a collection of digital media stored at the source computing device. The digital media at the source computing device can be rated by user and points assigned to the digital media. Furthermore, criteria may be applied to add points to the digital media where such criteria are based on user behavior or action as to the digital media. Based on the points of the digital media, a transfer list of digital media may be sent from the source computing device to the target computing device.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

FIG. 6 is a block diagram of a detailed implementation of a computing device which provides a graphical user interface of a list of thumbnails where particular thumbnails may be overlapped.

DETAILED DESCRIPTION

The following disclosure describes techniques in which digital media is transferred to one computing device such as a main personal computer (PC) to another computing device such as a portable media player. The transferring is based on user ratings and criteria based on user behavior as to the digital media.

Figure 1:
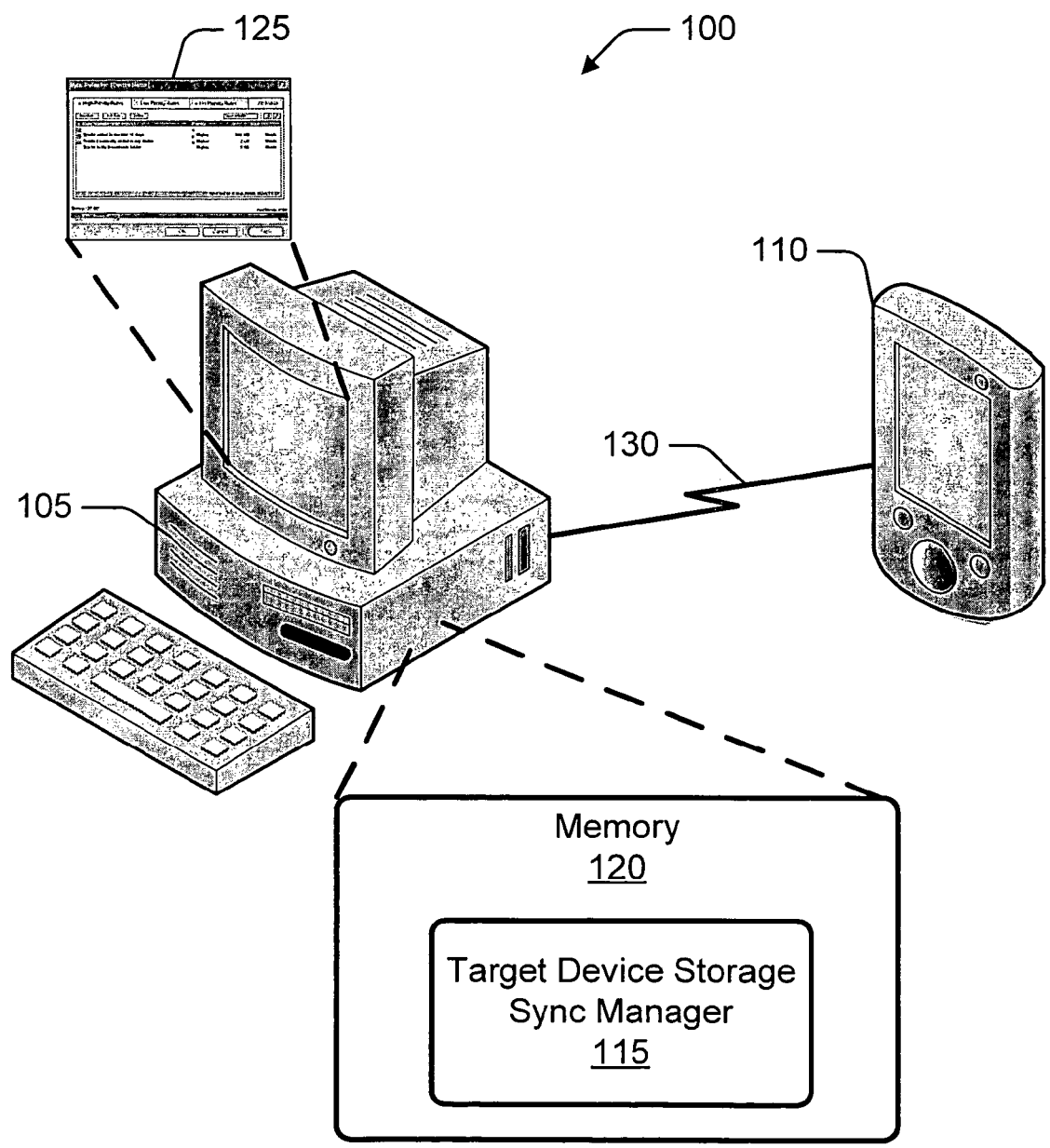
FIG. 1 is an illustration of a source device and a target device scenario in which digital media is transferred based on user priority and behavior.

FIG. 1 illustrates a source device to a target device synchronization scenario 100. The depicted scenario includes a source device 105 (e.g., a desktop personal computer) and a coupled target device 110 (e.g., a portable computing device such as a portable media player). An exemplary target device storage sync manager 115 may be implemented on the source device 105.

Target device storage sync manager 115 may be embodied on one or more processor-readable media (such as a computer storage or memory 120). Target device storage sync manager 115 operates on source device 105 and may be implemented as part of a multimedia software product, an operating system, or a dedicated multimedia appliance.

The exemplary target device storage sync manager 115 provides a user-configurable model for facilitating transfer of a subset of a user's collection of digital media to the target device 110 from the source device 105. Some digital media in the collection may be more important to the user than others. Importance of specific digital media may be based on a set of criteria and user rating. Examples of digital media in a digital collection may include audio (e.g., music), video (e.g. digital television), text, or image files.

In at least one embodiment, digital media that matter most to the user are prioritized based on a set of criteria. Points may be assigned to each digital media based such criteria and may be combined with points from a user rating as to each of the digital media. If memory space in the target device 110 allows, digital media having lower points may be used to fill the remaining memory space in target device 110. Digital media that the user does not want (i.e., very low points) on the target device 110 may not be transferred.

The scenario 100 shows a transfer interface 130 between the source device 110 and target device 120. Transfer interface 130 may be wired or wireless. Examples of a wired interface include USB, IEEE 1394, IEEE 1284 ("parallel" connection), RS-232 Serial connection, and/or Ethernet, Token Ring, and similar networks. Examples of a wireless interface include Bluetooth; Infra-Red (IR); 802.11a, b, or g; GPRS, CDMA, EVDO, EDGE, and other related wireless telephony data-transmission standards. In some implementations, transfer interface 130 may provide for data transfer over a short distance (e.g., measured in a few feet) or over a long distance (e.g., measured in miles).

From the highest to lowest priority (i.e., highest points to lowest points), digital media are transferred from the source device 105 to the target device 110 via the interface 130. This transfer occurs until the collection is exhausted or the storage capacity of the target device 110 is consumed. Assuming that the storage capacity of the target device 110 is less than that which would be consumed by an entire digital collection resident at source device 105, this action stores the most user-desirable (i.e., highest points) digital media from the digital collection.

The transfer of digital media from the source device 105 to the target 110 may be called "synchronization". As the collection on the source device 105 changes (e.g.; items removed, items added, and/or digital media rating changes), the subset of the collection which is stored on the target device 110 changes with each synchronization. If storage space on the target device 110 is limited, digital media may be removed from the target device 110 during synchronization and replaced with new digital media from the digital collection on the source device 105 which have higher points. Typically, the synchronization process will remove the lowest point digital media in bottom-up fashion until sufficient space is cleared to store higher priority digital media that have not yet been synchronized with the target device 110.

A user may assign points to digital media. These points may be combined with points derived from a set of criteria that is based on user behavior. For example, there may be a criteria that assigns more points to recently added (i.e., newer) digital media than older digital media. Other exemplary criteria are further described in detail below.

The source device 105 is depicted as a desktop personal computer. However, in other implementations, the source device 105 may be a portable laptop computer, a portable computing device, a mini-computer, a mainframe computer, a server, a storage system, a dedicated digital appliance, or another device having a storage sub-system configured to store a digital collection of digital media.

The target device 110 is depicted as a portable computing device, such as a portable media player. However, in other implementations, the target device 110 may be a non-portable computer, a portable laptop computer, a mini-computer, a mainframe computer, a server, a storage system, a dedicated digital appliance, or another device having a storage sub-system configured to store a digital collection of digital media.

Digital media of a collection may include any type of independently addressable unit of digital data which is typically stored within a computer memory or storage system. Examples of such digital media include, but are not limited to: music, image, video, text documents, hypertext document, documents of any format, applications, spreadsheets, graphics, play-lists, and data. Furthermore, digital media may include a collection of other digital media. In examples below, music files are used as a particular example of digital media.

Figure 2:
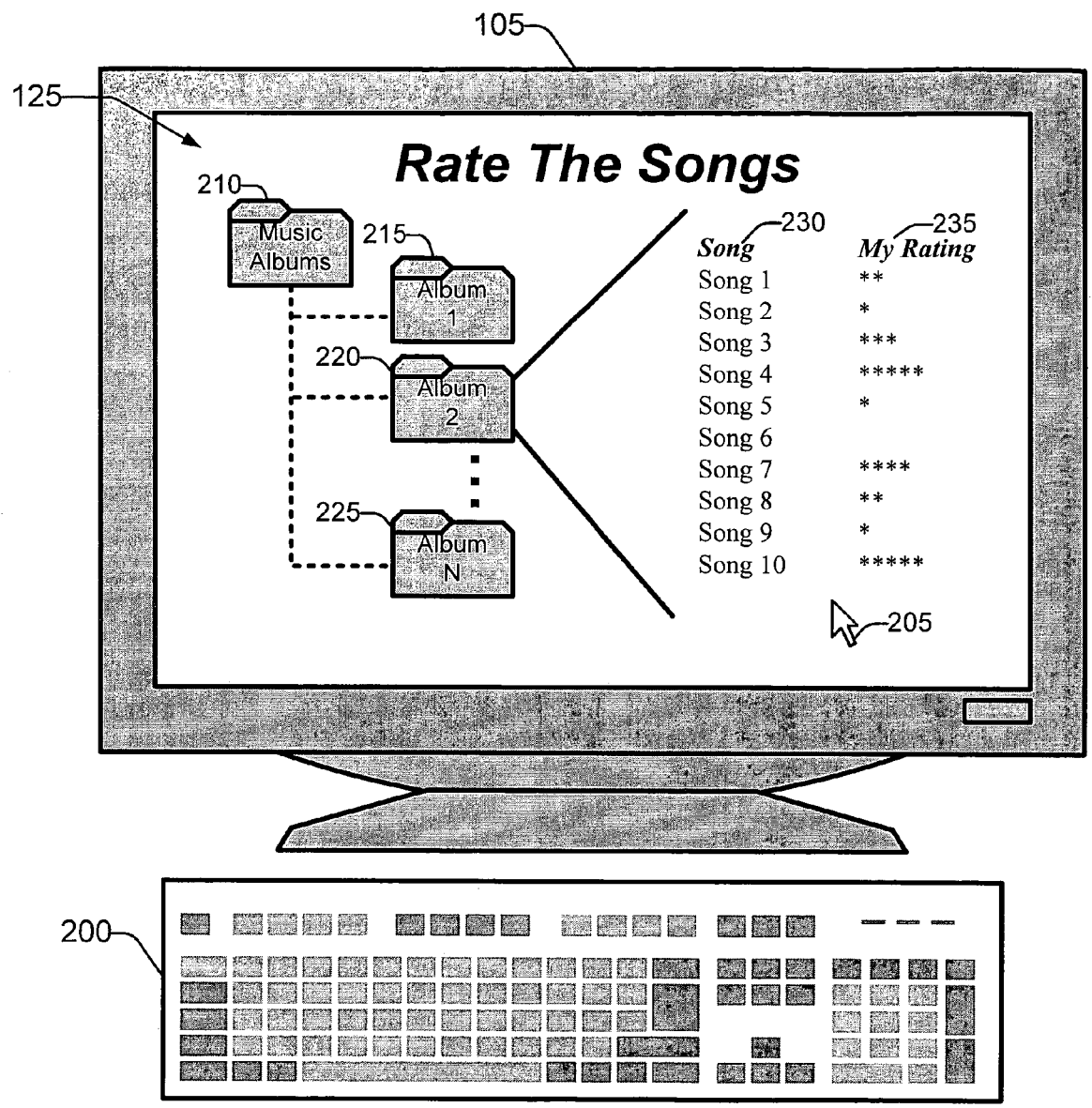
FIG. 2 is an illustration of a user interface that allows a user to rate digital media.

FIG. 2 shows a user interface that allows a user to rate digital media. In this example, music files as digital media are described; however, it is contemplated that other digital media may be rated. Computer 105 and particularly a screen of computer 105, displays the user interface 125 described above. The user interface 125 particularly provides information as to digital collections that are stored in computer 105.

Computer 105 includes a user input device such as keyboard 200. Keyboard 200 may include another user input device such as a mouse (not shown). In certain implementations, the input devices are separate of one another. The input devices specifically are used to maneuver an on-screen pointing icon 205. The pointing icon 205 is used to select particular elements in user interface 125.

In this example, user interface 125 includes a hierarchical structure of files that describe music albums that contain songs. The top element of the user interface 125 is "music albums" 210. A user may select "music albums" 210. The selection may open a list of elements described as "albums". Shown in the list of albums are "album 1" 215, "album 2" 220 and "album N" 225. The user may select an album from the list of albums. The example shows "album 2" 220 selected by the user. The selection of "album 2" 220 opens a list of songs which are included in "album 2" 220.

The songs in "album 2" 220 (and other albums) are presented in two columns. Column 230 identifies particular songs by name. It is contemplated that particular songs may be included in multiple albums. A unique name or identifier is used to distinguish specific songs. Column 235 identifies user defined ratings for each song. The user through an input device such as keyboard 200 may select a song in column 230 and assign a priority or rating value to the song. In this example, a rating system using stars or asterisks is used. The user may assign a value of zero to five stars (asterisks) to songs, with five stars (asterisks) being the highest priority or rating. The values may be translated to points which can be combined with points derived by other criteria to arrive at an overall point total for the songs (i.e., digital media)

Figure 3:
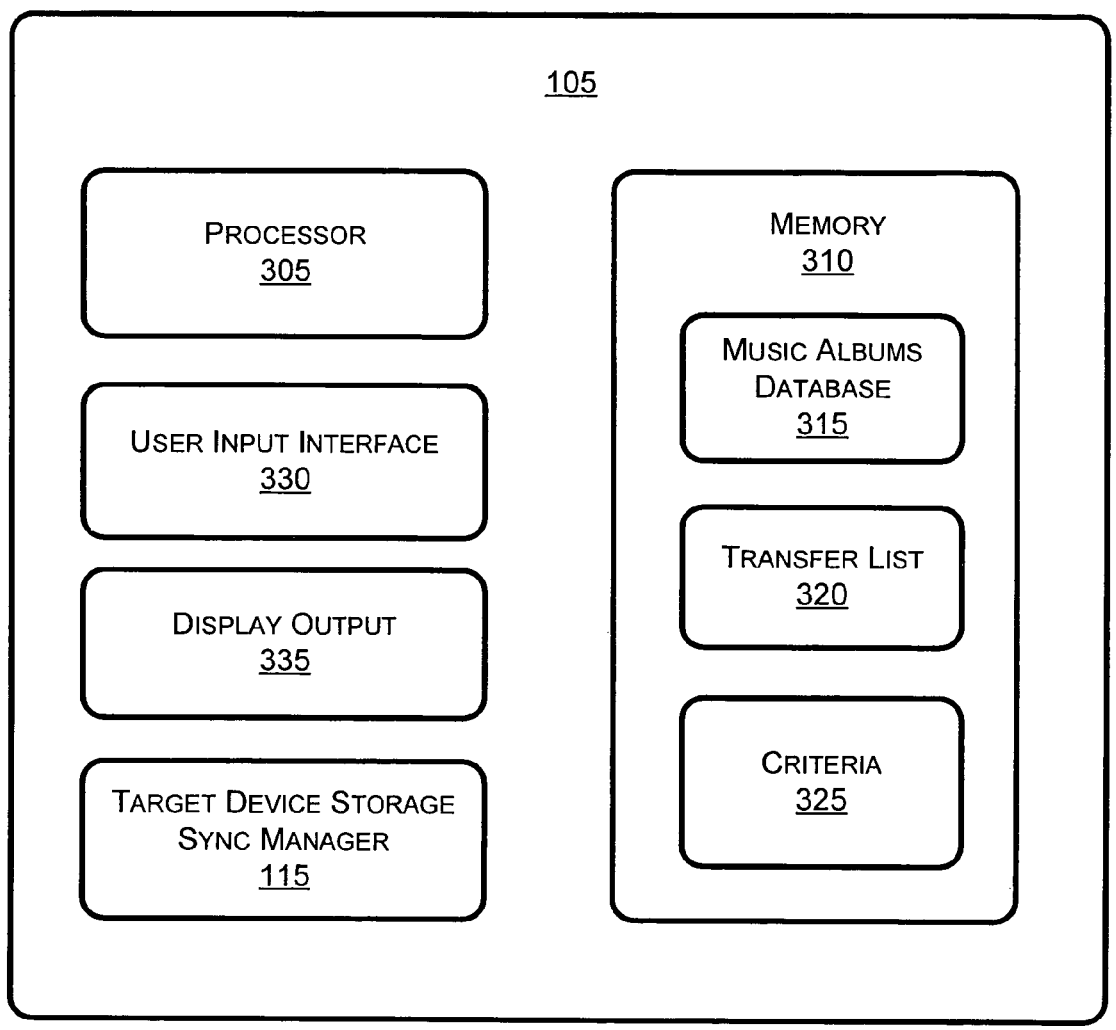
FIG. 3 is a block diagram of a computer used to synchronize digital media.

FIG. 3 shows source device or computer 105 in more detail. As discussed above, computer 105 is described as a main PC; however, as discussed above, computer 105 may also be a portable laptop computer, a portable computing device, a mini-computer, a mainframe computer, a server, a storage system, a dedicated digital appliance, or another device having a storage sub-system configured to store a digital collection of digital media. An exemplary architecture of computer 100 is further discussed in greater detail below in FIG. 5.

Computer 105 includes a central processing unit (CPU) or processor 305 and a memory 310. In one embodiment, processor 305 accesses memory 310 through a system bus (not shown). The memory 310 includes a collection or database of digital media, and in this example it is a "music albums database" 315.

Memory 310 includes a transfer list 320 which includes a list of songs (i.e., digital media) to be transferred to another computing device such as target device 110. In certain embodiments, transfer list 320 includes more than one record (list) to be transferred or has been transferred to more than one target device. In this example, transfer list 320 includes a particular list that will be transferred to a target device.

Memory 310 further includes "criteria" 325 which includes a set of criteria that are applied to particular digital media (i.e., songs) based on a user's behavior. User behavior may include actions performed by a user on computer 105, where such actions are tracked. Criteria 325 applies criteria (rules), from which points are derived. Such points are assigned to the digital media and may be combined with points from a user rating. Examples of particular criteria are described below.

As discussed above, computer 105 includes a target device storage sync manager 115 that may be stored in a separate memory 120. In certain embodiments, the target device storage sync manager 115 may be stored in memory 310. In addition to functions described above, target device storage sync manager 115 receives from a target device (e.g., target device 110) a current transfer list of songs resident in the target device.

Computer 105 further includes a user input interface 330 configured to communicate with memory 310 and processor 305. The user input interface 330 may receive inputs from input device such as keyboard 200 described above in order to enter a rating for each of the particular digital media. Such ratings may translate to points. The input from the user input interface may be manifested in a user interface such as user interface 125 described above.

Computer 105 includes a display output interface 335 configured to communicate with a display as described above. In particular, the display output interface 335 provides a user interface (e.g., user interface 125) that allows a user to enter priorities or ratings of songs. Such ratings may be used to generate points for each particular song.

In addition to points that are generated by user rating, points may be generated by the following criteria:

Digital media or song play count. For example, songs played a lot get more points and are more likely to stay on the target device. This criterion may apply to digital media songs played at the source device and/or the target device.

Association with other (different) files or albums. For example, songs that are included on multiple albums may be given higher points. Albums may apply to either the source device and/or the target device.

Creation or acquisition date. Recently purchased or recently recorded digital media may be given higher points than older digital media.

Purchase date. Recently purchased digital media may be given higher points.

Time consumed, where the time consumed may be the time listened to, time played, time viewed, time edited, etc. More recent time values may be given more points than older time values.

Availability of more interesting substitutes. For example, in the case of digital television media, last night's episode of a news program may be deleted in favor of today's episode of the news program.

Furthermore, overall points for the digital media (i.e., songs) may be based on a weighted factor for each of the criteria. In other words, particular criteria may provide higher points than other criteria.

Figure 4:
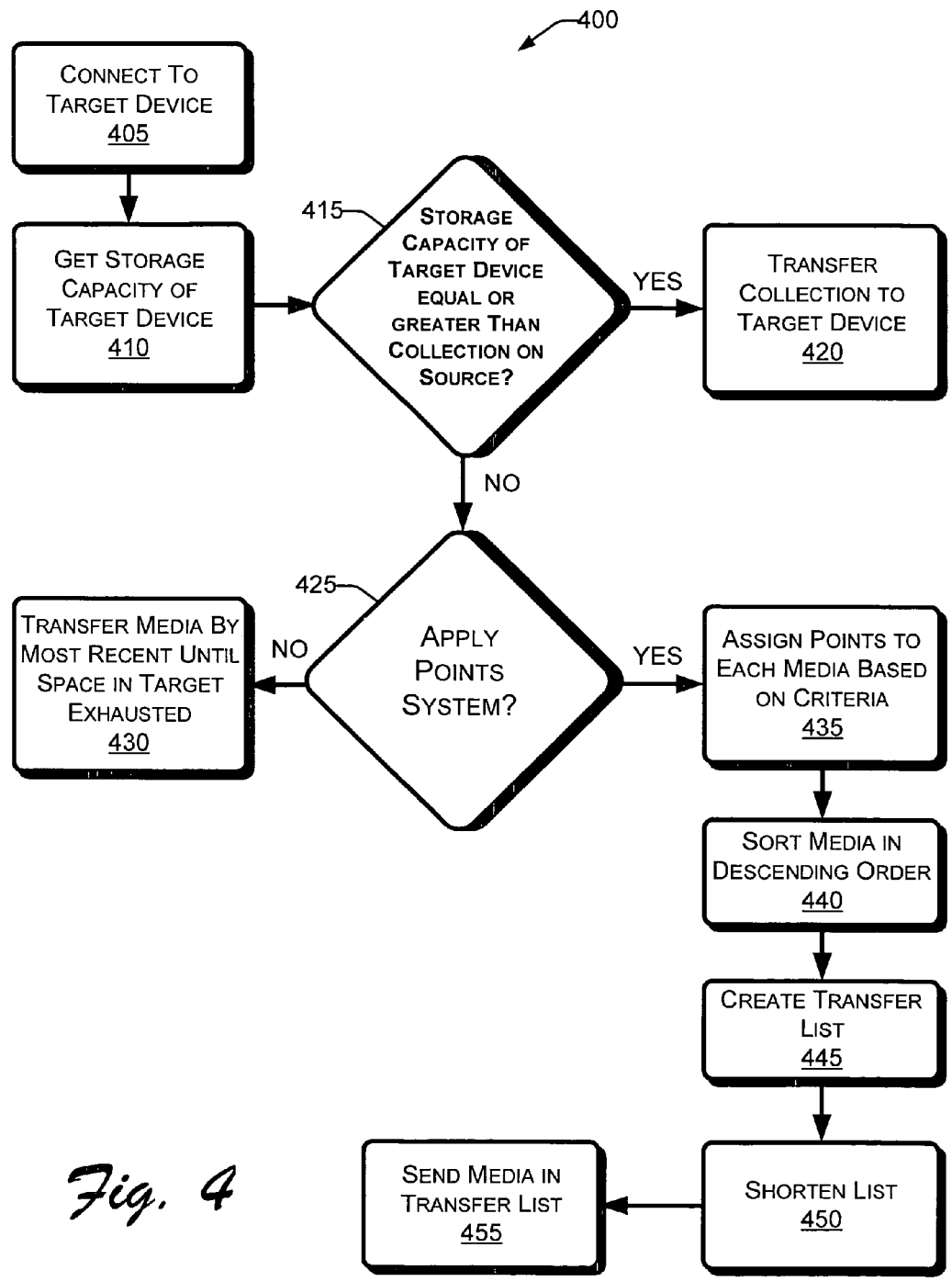
FIG. 4 is a flow diagram illustrating transferring digital media from a source device to a target device when the two devices are initially connected.

FIG. 4 shows a process 400 to transfer digital media from a target device to a source device. In particular, the process may be performed during an initial (i.e., first) connection between the target and the source device. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors (e.g., processor 305), perform the recited operations.

The process 400 is described with reference to computer 105 that implements the music albums database 315, the transfer list 320, criteria 325 and the target device storage sync manager 115 described above. Although described as a flowchart, it is contemplated that certain processes may take place concurrently or in a different order.

At block 405, a connection is established with a target device such as target device 110. The connection may be through a transfer interface such as transfer interface 130 and as described above may be through a wired/wireless interface or connection.

At block 410, the source device receives or gets the storage capacity of the target device. In specific, the storage capacity relates to the amount of digital media (e.g., songs) the target device is able to hold. Furthermore, it may be determined as to how much storage capacity is available and how much storage capacity is left.

If the storage capacity at the target device is equal or greater than the collection of digital media to be transferred from the source device (i.e., following the YES branch of block 415), at block 420 the collection of digital media is transferred to the target device. The transfer is of the entire collection of the digital media.

If the storage capacity at the target device is not equal or greater than the collection of digital media to be transferred from the source device (i.e., following the NO branch of block 415), the user may be given a choice as to transferring digital media.

If the user does not decide to apply a points system (i.e., following the NO branch of block 425), at block 430 transfer of digital media may occur by simply transferring digital media by the most recently added or recorded at the source device. The transfer takes place and continues until the storage capacity or space in the target device is exhausted.

If the user decides to apply a points system (i.e., following the YES branch of block 425), at block 435 media in a collection are assigned points based on criteria which may or may not include points from a user rating.

At block 440, the digital media is sorted in descending order. Digital media with higher points are placed in a higher order.

At block 445, a transfer list is created. The transfer list may be based on the capacity of the target device. The transfer list is created with digital media with higher points at the top of the transfer list.

At block 450, the transfer list may be shortened based on the storage capacity of the target device. In other embodiments, digital media from the transfer list is sent until the storage capacity of the target device is exhausted.

At block 455, the transfer list is sent to the target device. This step may be performed through the transfer interface 130 described above.

Figure 5:
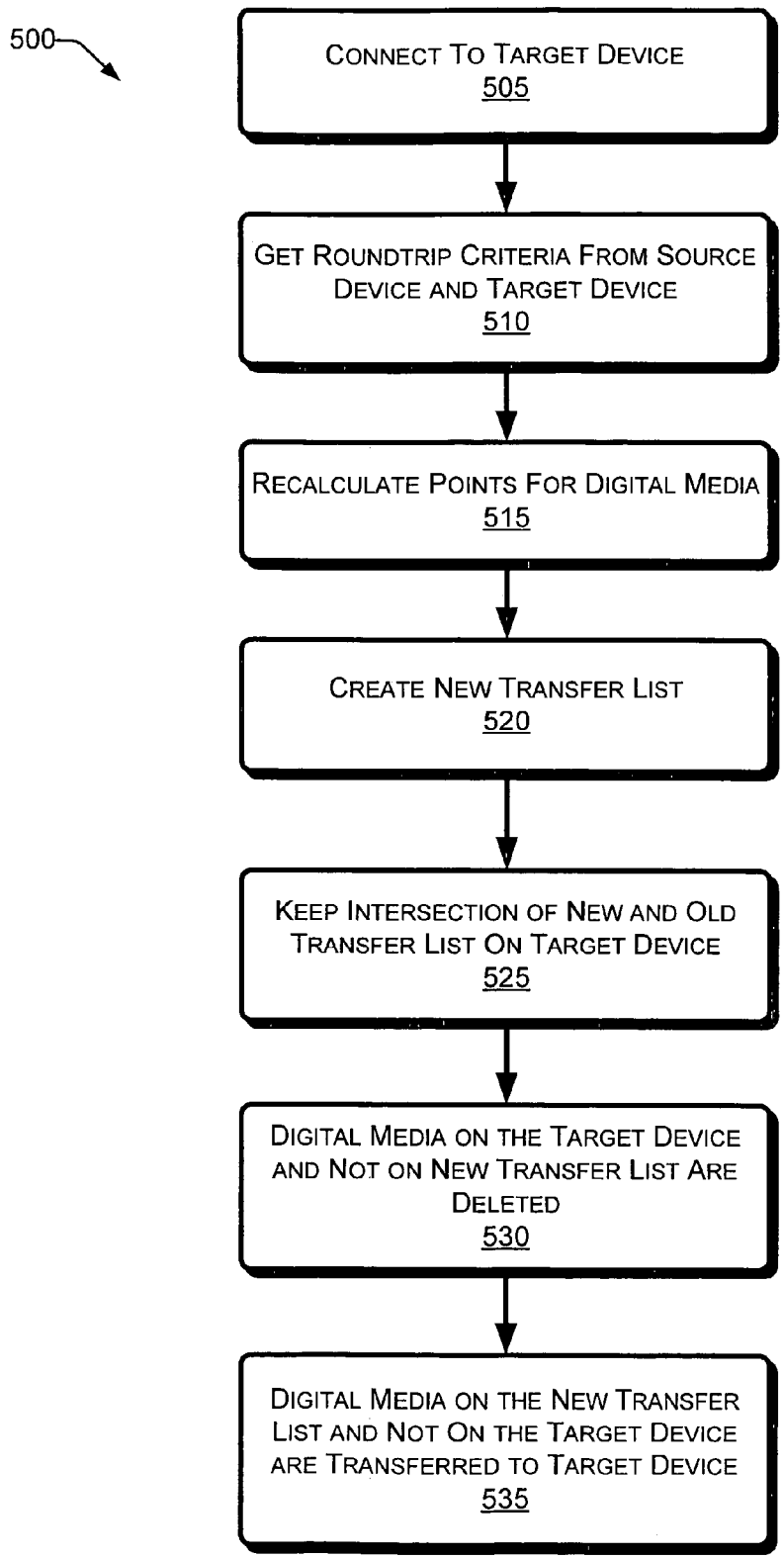
FIG. 5 is a flow diagram illustrating transferring digital media from a source device to a target device after a transfer list has been sent to the target device.

FIG. 5 shows a process 500 to transfer digital media from a target device to a source device after a transfer list has been sent to the target device. In particular, the process may be performed during subsequent (i.e., after initial) connections between the target and the source device where a transfer list of digital media has been sent to the target device. Process 500 may be freeing up storage space in the target device and transferring new highly rated digital items to the target device.

The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors (e.g., processor 305), perform the recited operations. The process 500 is described with reference to computer 105 that implements the music albums database 315, the transfer list 320, criteria 325 and the target device storage sync manager 115 described above. Although described as a flowchart, it is contemplated that certain processes may take place concurrently or in a different order.

At block 505, a connection is established with a target device such as target device 110. The connection may be through a transfer interface such as transfer interface 130 and as described above may be through a wired/wireless interface or connection.

At block 510, the source device gets roundtrip criteria of digital media that is stored in the source device and the target device. In particular, criteria describe rules that are applied to digital media from which points are derived. Such criteria may change from prior connections between the source device and target device.

At block 515, the collection of digital media is recalculated based on the roundtrip criteria. In specific, the digital media of the collection are given new points based on the roundtrip criteria.

At block 520, a new transfer list is created. The new transfer list of digital media is based on the new point values of the digital media as derived at block 515.

At block 525, an intersection of digital media from the old transfer list and the new transfer list are kept. In other words digital media that are common on both the old and new transfer list are kept and transferred over to the target device.

At block 530, a determination is made as to digital media that are on the target device and compared to the new transfer list. Digital media that are on the target device and not on the new transfer list are deleted from the target device. This frees up storage space on the target device.

At block 535, digital media that is not on the target device, but is on the new transfer list is transferred to the target device. This allows new higher priority digital media to be transferred to the target device.

Computer

FIG. 6 shows an example implementation of computer 105 in greater detail. It will be apparent that this exemplary implementation will include components that are not used in particular architectures, and that described components may be substituted in other architectures.

The computer 105 may be configured with a Windows® brand operating system. The computer 105 includes processing unit or processor 305 described above, a system memory or memory 310 also described above, and a system bus 615 that interconnects various system components, including the memory 310 to the processing unit or processor 305. The system bus 615 may be implemented as any one of several bus structures and using any of a variety of bus architectures, including a memory bus or memory controller, a peripheral bus, and a local bus.

The memory 310 includes read only memory (ROM) 620 and random access memory (RAM) 625. A basic input/output system 630 (BIOS) is stored in ROM 620.

The computer 105 has one or more of the following drives: a hard disk drive 630 for reading from and writing to a hard disk or hard disk array, a magnetic disk drive 635 for reading from or writing to a removable magnetic disk 640, and an optical disk drive 645 for reading from or writing to a removable optical disk 650 such as a CD ROM or other optical media. The hard disk drive 630, magnetic disk drive 635, and optical disk drive 645 are connected to the system bus 615 by a hard disk drive interface 660, a magnetic disk drive interface 665, and an optical drive interface 670, respectively. The drives and their associated computer-readable media provide nonvolatile storage of computer readable instructions, data structures, program modules and other data for computer 105.

Although hard disk 630, removable magnetic disk 635, and removable optical disk 650 are described, other types of computer readable media can be used to store data. Other such media include magnetic cassettes, flash memory cards, digital video disks, Bernoulli cartridges, random access memories (RAMs), read only memories (ROMs), and the like. Additionally, the computer 105 may be configured to serve data stored on an independent system, such as a RAID (redundant array of independent disks) storage system, particularly when implemented as a terminal server.

A number of program modules may be stored on the hard disk 630, magnetic disk 635, optical disk 650, ROM 620, or RAM 625. The programs include a server operating system 675, one or more application programs 680, other program modules 682 which include "music albums database" 315, transfer list 320, and automatic priority rules 325.

A user may enter commands and information into the computer 105 through input devices such as keyboard 200 and a mouse 688. Other input devices (not shown) may include a microphone, joystick, game pad, satellite dish, scanner, and the like. These and other input devices are connected to the processing unit 305 through a serial port interface 690 that is coupled to the system bus 615, but may alternatively be connected by other interfaces, such a parallel port, game port, or a universal serial bus (USB).

Display 605 or other type of display is also connected to the system bus 615 via an interface, such as a video adapter card 694 (or display output 335 as described above). The computer 105 has a network interface or adapter 696, a modem 698 or other means for establishing communications over network 699, such as an Internet connection. The modem 698 may also facilitate connection from a protocol decoder device.

CONCLUSION

The above-described computer and associated methods describe transferring selected digital media from a source device to a target device based on user behavior. Although the invention has been described in language specific to structural features and/or methodological acts, it is to be understood that the invention defined in the appended claims is not necessarily limited to the specific features or acts described. Rather, the specific features and acts are disclosed; as exemplary forms of implementing the claimed invention.

What is claimed is:

1. A method comprising:

connecting with a target device at a source device;

determining, at the source device, a storage capacity of the target device to store digital media;

receiving, at the source device, a first list of digital media resident in the target device, wherein each digital media item of the first list is associated with a first number of points and the first number of points assigned to each digital media item of the first list is based on a user rating and at least one first additional criteria;

determining whether the storage capacity of the target device is greater than a storage capacity consumed by digital media stored by the source device;

providing, by the source device, an option to apply a points system to determine digital media items to transfer from the source device to the target device when the storage capacity of the target device is less than the storage capacity consumed by the digital media stored by the source device;

assigning a second number of points, at the source device, to each digital media item of a list of the digital media stored in the source device in response to selection of the option to apply the points system by a user of the source device, wherein the second number of points is based on a user rating associated with each digital media item and based on at least one second additional criteria;

generating, at the source device, a new transfer list based on the second number of points assigned to the digital media items of the list of digital media stored in the source device;

sending digital media items from the source device to the target device that are included on the new transfer list and are not included on the first list;

directing, by the source device, the target device to remove digital media items from the first list that are not included on the new transfer list; and receiving, at the source device, a second list of digital media items resident on the target device, wherein the second list includes digital media items common to the first list and the new transfer list, and wherein digital media items included on the first list and not on the new transfer list are not included in the second list, and wherein the digital media items of the first list and the second list are stored on the source device.

2. The method of claim 1 wherein the first additional criteria and the second additional criteria are different.

3. The method of claim 1 wherein the first additional criteria, the second additional criteria, or a combination thereof, includes user behavior performed on at least one of the digital media stored in the target device and the digital media stored in the source device.

4. The method of claim 3 wherein the user behavior is based on one or more of the following: play count, association of digital media in different files, creation date, and availability of substitute digital media.

5. The method of claim 1 wherein the second number of points assigned to the digital media items of the list of digital media stored in the source device are based on a weighted factor applied to respective user ratings, the first additional criteria, the second additional criteria, or a combination thereof.

6. The method of claim 1 wherein the first additional criteria and the second additional criteria are the same.

7. The method of claim 1 wherein an amount of media items sent from the source device to the target device is based on the storage capacity of the target device.

8. The method of claim 4 wherein the play count is related to digital media items played at the source device, digital media items played at the target device, or a combination thereof.

9. The method of claim 1 wherein the digital media comprises one or more of the following: music, image, video, text, documents, applications, spreadsheets, graphics, play-lists, and data.

10. A computer-readable medium having computer-executable instructions for performing the method recited in claim 1.

11. A computing device comprising:
a processor;
a memory that includes:
  a listing of digital media;
  criteria applicable to the digital media;
  a transfer list that includes a prioritized list of digital media items based on the criteria; and
a target device storage sync manager to:
  determine when digital media to be transferred to a target device exceeds the storage capacity of the target device;
  provide a first option and a second option to a user of the computing device when the digital media to be transferred exceed the storage capacity of the target device, wherein the first option applies a points system to the digital media to identify digital media items to transfer to the target device based on a user rating associated with each digital item of the digital media and based on the criteria, and wherein the second option transfers to the target device most recently added digital media items to the target source device until the storage capacity of the target device is reached;
  receive an indication of selection of the first option by the user or selection of the second option by the user;
  transfer the digital media items of the transfer list to the target device when the digital media items do not exceed the storage capacity of the target device; and
  direct the target device to remove digital media items that are not on the transfer list, wherein at least one of the items removed from the target device is included in the listing of digital media.

12. The computing device of claim 11 wherein the criteria include one or more of the following: play count, association with digital media in different files, creation date, purchase, recording date, time consumed by the user, and availability of substitute digital media.

13. The computing device of claim 11 further comprising a user input interface to receive input from the user as to the user rating.

14. The computing device of claim 13 wherein the user input interface provides input to a user interface displayed by the computing device to the user.

15. In a computing device having a user interface, including a display and a user input device, a method of assigning points to digital media comprising:
presenting a list of songs to a user on the display of the computing device;
in response to a selection by the user, presenting, by the computing device, one of the songs from the list;
selectively receiving, at the computing device, a rating for a particular song from the user, wherein the particular song is given a point value based on the rating which is combined with points from other criteria;
determining whether a storage capacity of a target device is greater than a storage capacity consumed by a collection of songs stored by the computing device;
providing, by the computing device, an option to apply a points system to determine songs to transfer from the computing device to the target device when the storage capacity of the target device is less than the storage capacity consumed by the collection of songs stored by the computing device; and
generating, by the computing device, a transfer list of songs to be transferred from the computing device to the target device, wherein the songs are included in the transfer list based on a number of points associated with each song when the option to apply a points system is selected, and wherein the songs are included in the transfer list based on most recently recorded at the computing device when the option to apply a points system is not selected; and
directing, by the computing device, the target device to remove songs that are not included in the transfer list, wherein a copy of the songs removed from the target device are stored at the computing device.

16. The method of claim 15 wherein the presenting illustrates a hierarchical structure of the songs.

17. The method of claim 15 wherein the selecting is performed using a pointing icon controlled by a user input device.

18. The method of claim 15 wherein the songs are further rated based on actions performed by the user.

19. A computer-readable medium having computer-executable instructions for performing the method recited in claim 15.

* * * * *